United States Patent [19]

Collins

[11] Patent Number: 4,544,133
[45] Date of Patent: Oct. 1, 1985

[54] SHUT-OFF VALVE FOR A SPRAYER

[75] Inventor: Dean E. Collins, Lowell, Mich.

[73] Assignee: Root-Lowell Mfg., Co., Lowell, Mich.

[21] Appl. No.: 613,818

[22] Filed: May 25, 1984

[51] Int. Cl.⁴ .............................................. F16K 31/00
[52] U.S. Cl. .................................... 251/344; 251/348; 251/263
[58] Field of Search ................ 251/344, 347, 348, 263

[56] References Cited

U.S. PATENT DOCUMENTS

| | | | |
|---|---|---|---|
| 2,622,841 | 12/1952 | Held | 251/263 |
| 2,838,104 | 6/1958 | Midtlyng | 251/263 |
| 2,945,703 | 7/1960 | Ballard | 251/248 |
| 2,959,391 | 11/1960 | Rapaport | 251/263 |
| 3,075,538 | 1/1963 | Stafford | 251/344 |
| 3,199,199 | 8/1965 | Harrell et al. | 251/344 |
| 4,396,154 | 8/1983 | Iovino et al. | 251/344 |

Primary Examiner—A. Michael Chambers
Attorney, Agent, or Firm—James D. Hall

[57] ABSTRACT

A shut-off valve for a sprayer which includes an O-ring seal circumscribing the valve stem and serving the dual function of a packing seal between the stem and valve housing at all times as well as preventing fluid flow through the valve when the stem is in its closed position.

4 Claims, 5 Drawing Figures

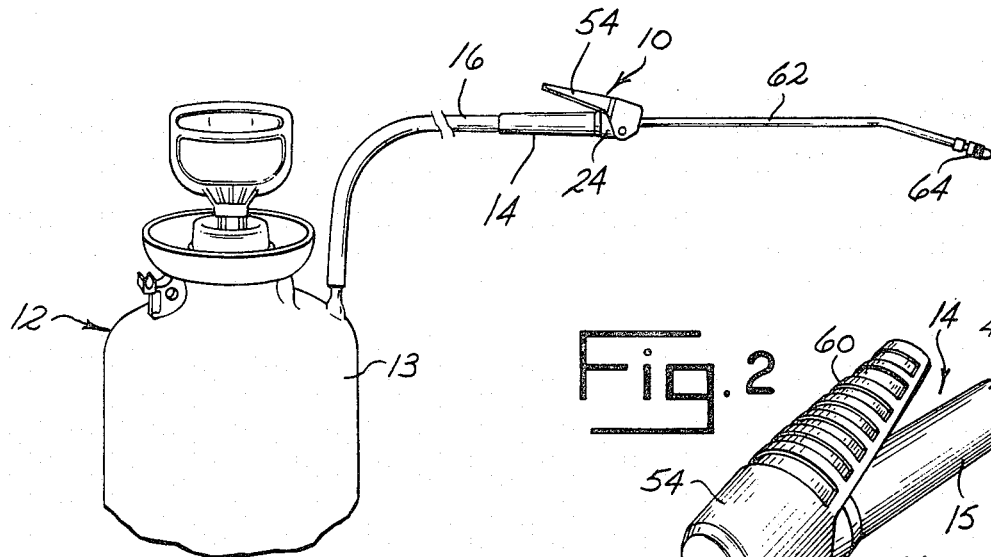
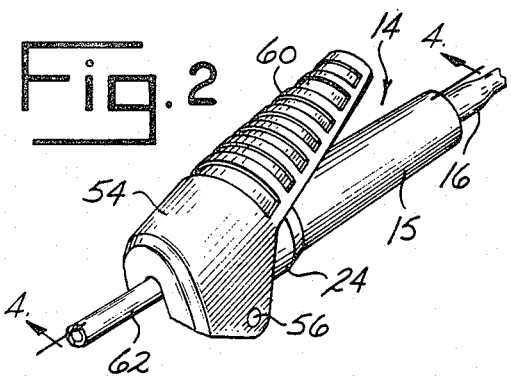
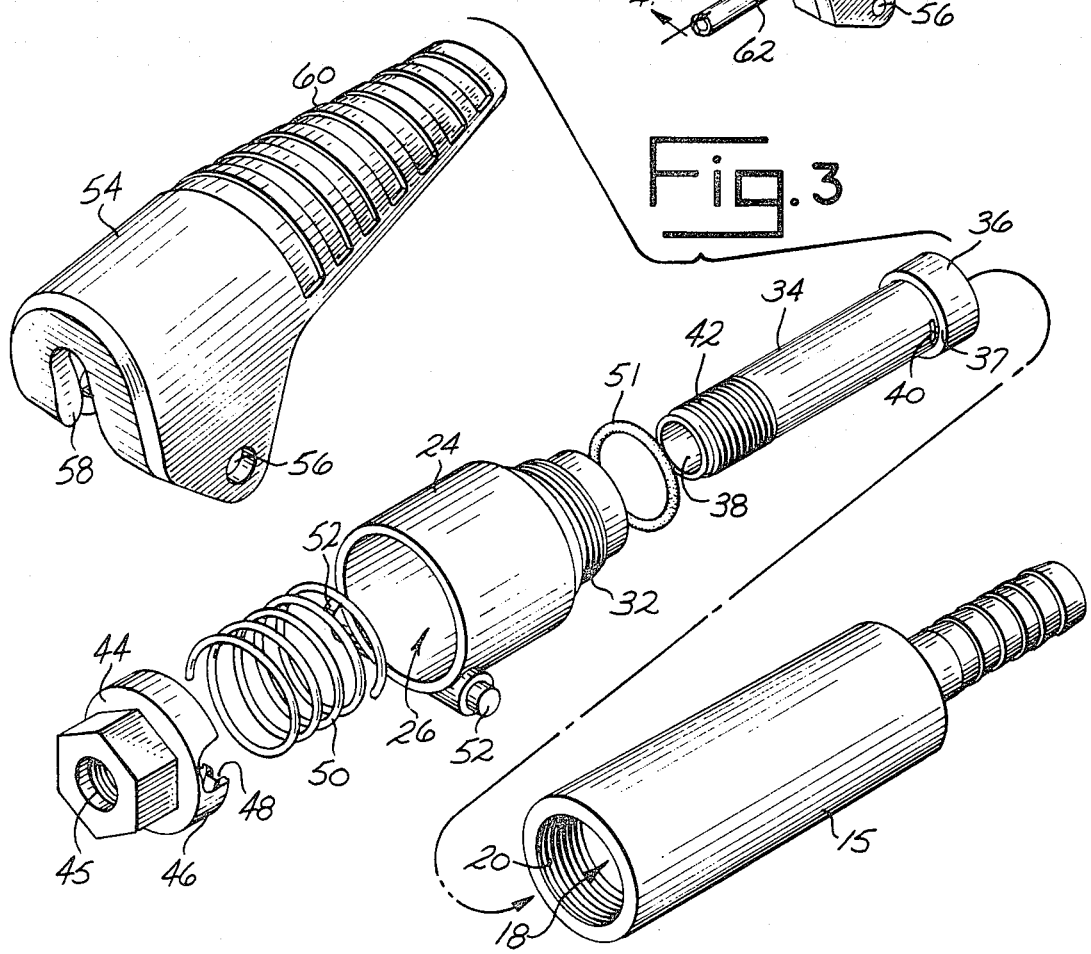

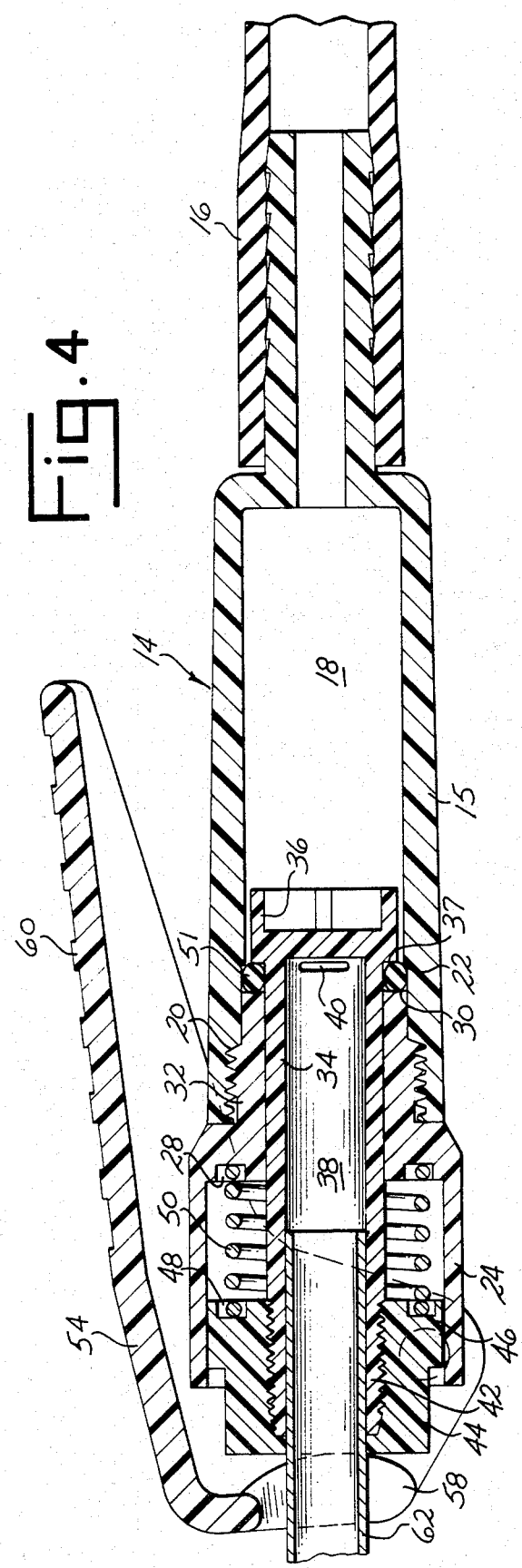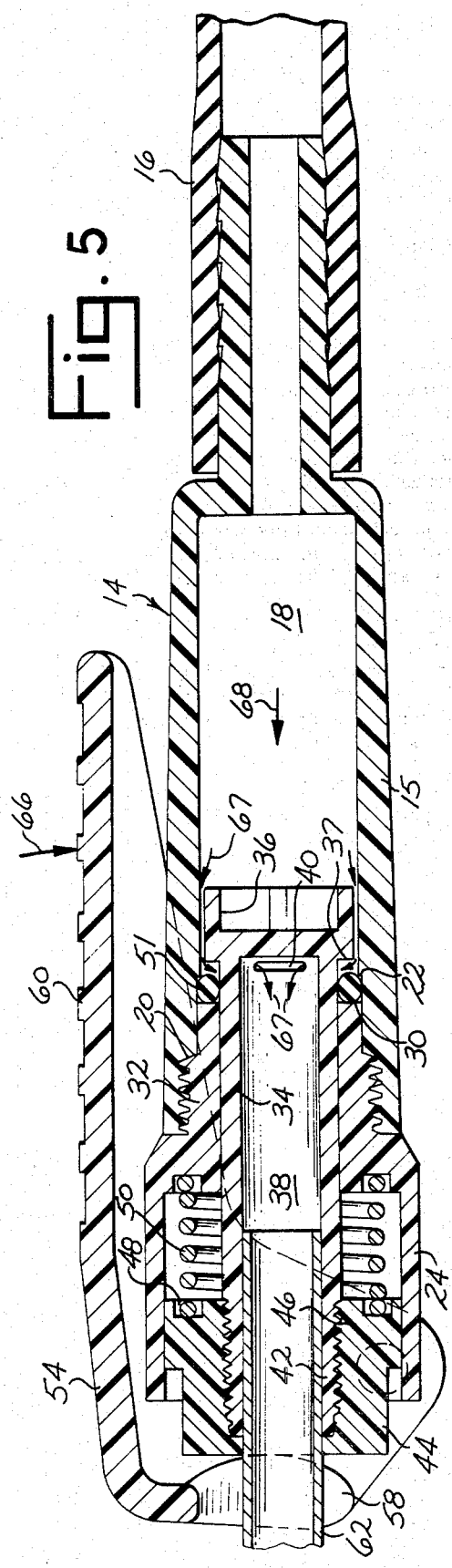

SHUT-OFF VALVE FOR A SPRAYER

SUMMARY OF THE INVENTION

This invention relates to an improved shut-off valve for a sprayer and will have specific application to a pressurized fluid type sprayer.

Heretofore, shut-off valves in sprayers utilizing forced fluid flow included one seal member to prevent fluid flow at the valve seat when the valve was closed. A second member sometimes had to be provided to seal the valve stem against leakage. Some examples of prior valves are shown in U.S. Pat. Nos. 3,670,966; 4,124,163; 2,633,150; 3,035,606; 3,393,873; 3,961,756; 2,731,092; 3,498,546; and 2,991,985.

The valve of this invention is constructed to allow a single O-ring to be utilized to perform both the valve stem sealing and the valve seat fluid flow stoppage functions. As a result a more efficient valve is provided at a lower cost.

Accordingly, it is an object of this invention to provide an improved valve assembly which is for a sprayer.

Another object of this invention is to provide for a sprayer valve which is economical.

Another object of this invention is to provide for a sprayer valve assembly which efficiently controls fluid flow and seals against internal leakage.

Other objects of this invention will become apparent upon a reading of the following description.

BRIEF DESCRIPTION OF THE DRAWINGS

A preferred embodiment of the invention has been chosen for purposes of illustration wherein:

FIG. 1 is a perspective view of the valve assembly shown in use on a forced flow sprayer.

FIG. 2 is a fragmentary perspective view of the valve.

FIG. 3 is an exploded view of the valve and its component parts.

FIG. 4 is a sectional view taken along line 4—4 of FIG. 2 showing the valve in its closed position.

FIG. 5 is a sectional view similar to FIG. 4 but showing the valve in an open position.

DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use to enable others skilled in the art to utilize the invention.

The valve assembly 10 of this invention is adapted for use with a forced flow sprayer 12. Valve 10 includes a two part valve housing 14, which is connected to conduit 16 of sprayer 12, and includes a central bore 18 to permit fluid flow therethrough. Valve housing part 15 is threaded at 20 and includes an internal annular shoulder 22. Value housing part 24 includes an internal annular shoulder 26 with an annular internal groove 28 formed in it and a narrowed threaded projection 32 which terminates in an end edge 30. Valve housing part 24 is threaded into valve housing part 15 with end edge 30 being spaced forwardly of shoulder 22.

Slidably fitted within valve housing part 24 is a valve stem 34 which terminates in a head 36. Valve stem 34 includes an internal bore 38 in communication with transverse openings 40 through the stem near head 36. Stem 34 is threaded at its other end 42 into an end member 44 which slides within valve housing part 24. End member 44 includes a central bore 45 and a rear end face 46 having an annular internal groove 48 formed in it. A helical spring 50 surrounds stem 34 and fits into end member groove 48 at one end thereof and into valve housing part groove 28 at its other end to bias the sliding movement of end member 44 and connected stem 34 relative to housing 14. An O-ring 51 circumscribes stem 34 and is located restrictively between housing shoulder 22 and end edge 30 in compressive contact with the stem and the side wall of housing bore 18.

Valve housing part 24 also includes oppositely protruding pins 52. A shut-of actuator or lever 54 is pivotally fitted about pins 52 at lever openings 56. Lever 54 includes a slotted wall 58 located forwardly of openings 56 and in contact with end member 44. A conduit 62 extends through lever wall 58 and is fitted within valve stem bore 38 to provide flow communication between sprayer 12 and a nozzle 64.

Valve assembly 10 operates as follows. With lever 54 in the closed position shown in FIG. 4, an operator pushes the lever handle section 60 in the direction of arrow 66 causing lever wall 58 to push end member 44 and valve stem 34 rearwardly towards conduit 16 and the compression of spring 50. This causes valve stem transverse openings 40 to be moved with the valve stem beyond or rearwardly of O-ring 51. This positioning of openings 40 allows fluid under pressure from sprayer tank 12 to flow around stem head 36, through stem openings 40 and 38 to conduit 62 and out through nozzle 64 as shown by arrows 67 in FIG. 5. When lever 54 is released, spring 50 urges end member 44 and stem 34 forwardly in the direction of arrow 68 until stem head 36 abuts O-ring 51 at its annular shoulder 37 to seal stem openings 40. In this closed position (shown in FIG. 4), O-ring 51 both prevents fluid flow from housing bore 18 into stem bore 38 through openings 40, prevents leakage between valve stem 34 and value housing part 24, and also prevents leakage between valve parts 15 and 24. When the valve assembly 10 is in its open position (shown in FIG. 5), O-ring 51 prevents leakage between valve stem 34 and valve housing part 24 and between valve parts 15 and 24 while fluid flows through stem openings 40.

It is to be understood that the scope of the invention is not limited to the above description, but may be modified within the scope of the appended claims.

I claim:

1. A shut-off valve for a sprayer, said valve comprising a housing having an inlet adapted for flow communication with a fluid source, said housing including an internal bore in flow communication with said inlet, a valve stem slidably positioned within said housing bore between open and closed position, said stem including a longitudinal bore in flow communication with an outlet at one end of the stem, a transverse opening in said stem into said longitudinal bore therein to provide flow communication between said housing bore and said stem longitudinal bore, and an annular sealing means positioned about said stem and contacting the stem and said housing for sealing the stem and housing against fluid flow therebetween at both open and closed positions of said stem, said sealing means when said stem is in its closed position for preventing fluid flow through said stem transverse opening, said sealing means when said stem is in its open position being spaced from said stem transverse opening for allowing fluid flow through said opening and stem bore to said stem outlet, and actuation means for urging said stem into a selected one of its said closed and open positions.

2. The shut-off valve of claim 1 and biasing means for normally urging said stem into its said closed position.

3. The shut-off valve of claim 1 wherein said stem includes a head part at the opposite end of the stem, said stem transverse opening positioned between said head and one end of the stem, said sealing means compressed between said stem head and housing when the stem is in its closed position, said stem being shiftable relative to said sealing means during movement between its said open and closed positions.

4. The shut-off valve of claim 3 wherein said stem transverse opening is located adjacent said stem head and is positioned with the stem head in a spaced relationship from said sealing means when said stem is in its said open position.

* * * * *